United States Patent
Lu (10) Patent No.: US 10,367,877 B2
(45) Date of Patent: Jul. 30, 2019

(54) SYSTEM AND METHOD FOR IDENTIFYING PUBLICLY AVAILABLE CAMERAS

(71) Applicant: Purdue Research Foundation, West Lafayette, IN (US)

(72) Inventor: Yung-hsiang Lu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 191 days.

(21) Appl. No.: 15/468,068

(22) Filed: Mar. 23, 2017

(65) Prior Publication Data

US 2018/0278573 A1    Sep. 27, 2018

(51) Int. Cl.
*G06F 15/16*    (2006.01)
*H04L 29/08*    (2006.01)
*H04L 29/12*    (2006.01)

(52) U.S. Cl.
CPC .............. *H04L 67/02* (2013.01); *H04L 67/12* (2013.01); *H04L 61/103* (2013.01); *H04L 61/609* (2013.01); *H04L 61/6022* (2013.01); *H04L 61/6068* (2013.01)

(58) Field of Classification Search
CPC ....... H04L 67/02; H04L 67/12; H04L 61/103; H04L 61/609; H04L 61/6022; H04L 61/6068
USPC ................. 709/245–246, 202–205
See application file for complete search history.

(56) References Cited

U.S. PATENT DOCUMENTS

| | | | | |
|---|---|---|---|---|
| 7,904,712 B2* | 3/2011 | Bush | ...................... | H04L 67/08 713/153 |
| 9,509,963 B2* | 11/2016 | Enjouji | .................. | H04N 7/183 |
| 9,596,438 B2* | 3/2017 | Ishikawa | ................ | H04N 7/183 |
| 2006/0031359 A1* | 2/2006 | Clegg | ..................... | H04L 51/12 709/203 |
| 2013/0050396 A1* | 2/2013 | Zhu | ......................... | H04N 7/18 348/14.02 |
| 2015/0003675 A1* | 1/2015 | Nakagami | .......... | G06K 9/00523 382/103 |
| 2015/0019621 A1* | 1/2015 | Kao | ........................ | H04L 67/02 709/203 |
| 2018/0053389 A1* | 2/2018 | Ouedraogo | ............. | H04L 67/12 |

OTHER PUBLICATIONS

Niko Sünderhauf, Sareh Shirazi, Adam Jacobson, Feras Dayoub, Edward Pepperell, Ben Upcroft, and Michael Milford. Place Recognition With Convnet Landmarks: Viewpoint-Robust, Condition-Robust, Training-Free Proceedings of Robotics: Science and Systems (RSS). 2015.

S. M. I. Alam, S. Fahmy, and Y.-H. Lu. Litmas: Live Road Traffic Maps for Smartphones. In IEEE Workshop on Video Everywhere 2015.

(Continued)

*Primary Examiner* — Bharat Barot
(74) *Attorney, Agent, or Firm* — Piroozi-IP, LLC (57) ABSTRACT

A method for identifying network cameras is disclosed. The method includes receiving name of an organization, identifying a range of internet protocol (IP) address associated with the organization, querying each IP address in the range of the IP addresses, receiving a response from the IP addresses in response to the queries, verifying the received response is from a camera by obtaining an image file from the IP address and analyzing the image file, and adding IP address to a list of identified cameras.

20 Claims, 6 Drawing Sheets

(56) References Cited

OTHER PUBLICATIONS

Minwoo Park, Jiebo Luo, Robert T. Collins, Yanxi Liu. Beyond GPS: Determining the Camera Viewing Direction of a Geotagged Image. Proceedings of the 18th International Conference on Multimedea. 2010.
W. Chen, Y.-H. Lu, and T. J. Hacker. Adaptive Cloud Resource Allocation for Analysing Many Video Streams. In IEEE International Conference on Cloud Computing Technology and Science. 2015.
J. Choe, T. Pramoun, T. Amornraksa, Y.-H. Lu, and J. D. E. Image-Based Geographical Location Estimation Using Web Cameras. In Southwest Symposium on Image Analysis and Interpretation, pp. 73-76. 2014.
A. Dickinger and J. Mazanec. Consumers' Preferred Criteria for Hotel Online Booking. In P. OConnor, W. Hpken, and U. Gretzel, Editors, Information and Communication Technologies in Tourism 2008, pp. 244-254. Springer Vienna. 2008.
Carl Doersch, Saurabh Singh, Abhinav Gupta, Josef Sivic, and Alexei A. Efros. What Makes Paris Look Like Paris? Communications of the ACM. vol. 58. No. 12 pp. 103-110. 2015.
Mahdi Salarian, Andrea Manavella, Rashid Ansari. Accurate Localization in Dense Urban Area Using Google Street View Images. SAI Intelligent Systems Conference (INTELLISYS). 2015.
T. J. Hacker and Y.-H. Lu. An Instructional Cloud-Based Testbed for Image and Video Analytics. In Emerging Issues in Cloud Workshop of CLOUDCOM. 2014.
N. Hemsoth. On the API for Harvesting Global Camera Networks. The Platform, http://www.theplatform.net/2015/04/02/ an-api-for-harvesting-global-camera-networks/. Apr. 2, 2015.
A. S. Kaseb, E. Berry, Y. Koh, A. Mohan, W. Chen, H. Li, Y.-H. Lu, and E. J. Delp. A System for Large-Scale Analysis of Distributed Cameras. In IEEE Global Conference on Signal and Information Processing. 2014.
A. S. Kaseb, E. Berry, E. Rozolis, K. McNulty, S. Bontrager, Y. Koh, Y.-H. Lu, and E. J. Delp. An Interactive Web-Based System for Large-Scale Analysis of Distributed Cameras. In Imaging and Multimedia Analytics in a Web and Mobile World. 2015.
A. S. Kaseb, W. Chen, G. Gingade, and Y.-H. Lu. Worldview and Route Planning Using Live Public Cameras. In Imaging and Multimedia Analytics in a Web and Mobile World. 2015.
A. S. Kaseb, A. Mohan, and Y.-H. Lu. Cloud Resource Management for Image and Video Analysis of Big Data From Network Cameras. In International Conference on Cloud Computing and Big Data. 2015.
Y.-H. Lu and E. J. Delp. An Overview of Problems in Image-Based Location Awareness and Navigation. In Visual Communications and Image Processing, pp. 102-109. 2004.
Dragomir Anguelov, Carole Dulong, Daniel Filip, Christian Frueh, Stéphane Lafon, Richard Lyon, Abhijit Ogale, Luc Vincent, and Josh Weaver. Google Street View: Capturing the World at Street Level. IEEE Computer Society. 2010.
I. Poese, S. Uhlig, M. A. Kaafar, B. Donnet, and B. Gueye. IP Geolocation Databases: Unreliable? SIGCOMM Comput. Commun. Rev., 41(2):53-56. Apr. 2011.
L. C. Pouchard, M. S. Nelson, and Y.-H. Lu. Comparing Policies for Open Data From Publicly Accessible International Sources. In Annual Conference International Association for Social Science Information Services & Technology. 2015.
T. Pramoun, J. Choe, H. Li, Q. Chen, Humrongrat Amornraksa, Y.-H. Lu, and E. J. D. III. Webcam Classification Using Simple Features. In Computational Imaging. 2015.
A. Richardson, J. Jenkins, B. Braswell, D. Hollinger, S. Ollinger, and M.-L. Smith. Use of Digital Webcam Images to Track Spring Green-Up in a Deciduous Broadleaf Forest. Oecologia. 2007.
Andr'as L. Majdik, Yves Albers-Schoenberg, Davide Scaramuzza. MAV Urban Localization From Google Street View Data IEEE/RSJ International Conference on Intelligent Robots and Systems (IROS). 2013.
David M. Chen, Georges Baatz, Kevin Koser, Sam S. Tsai, Ramakrishna Vedantham, Timo Pylvänäinen, Kimmo Roimela, Xin Chen, Jeff Bach, Marc Pollefeys, Bernd Girod, Radek Grzeszczuk. City-Scale Landmark Identification on Mobile Devices. Computer Vision and Pattern Recognition (CVPR). 2011.
W.-T. Su, Y.-H. Lu, and A. S. Kaseb. Harvest the Information From Multimedia Big Data in Global Camera Networks. In IEEE International Conference on Multimedia Big Data 2015.
W.-T. Su, K. McNulty, and Y.-H. Lu. Teaching Large-Scale Image Processing Over Worldwide Network Cameras. In IEEE International Conference on Digital Signal Processing. 2015.
Tat-Jen Cram, Arridhana Ciptadi, Wei-Chian Tan, Minh-Tri Pham, Liang-Tien Chia, Estimating Camera Pose From a Single Urban Ground-View Omnidirectional Image and a 2D Building Outline Map. IEEE. 2010.
Decorah Eagle Cam Live Feed. http://www.decoraheaglecamalerts.com/. Date: Unknown.
FFIEC. Ffiec geocoding system. https://geomap.ffiec.gov/FFIECGeocMap/GeocodeMap1.aspx. Date: Unknown.
Google geocoding api. https://developers.google.com/maps/documentation/geocoding/. Date: Unknown.
N. P. Service. Hawai'i Volcanoes National Park. http://www.nature.nps.gov/air/webcams/parks/havocam/havocam.cfm. Date: Unknown.
N. P. Service. Old faithful geyser streaming webcam. http://www.nps.gov/features/yell/webcam/oldFaithfulStreaming.html. Date: Unknown.

* cited by examiner

SYSTEM AND METHOD FOR IDENTIFYING PUBLICLY AVAILABLE CAMERAS

STATEMENT OF GOVERNMENT SUPPORT

This invention was made with government support under ACI-1535108 awarded by the National Science Foundation. The government has certain rights in the invention.

CROSS-REFERENCE TO RELATED APPLICATIONS

The present application is related to and incorporates by reference U.S. Non-provisional patent application Ser. No. 15/468,014, concurrently filed with the present application.

TECHNICAL FIELD

The present application relates to identifying cameras in a network of cameras, and particularly identifying public and closed circuit television cameras and the metadata associated with each in a static or dynamic manner.

BACKGROUND

This section introduces aspects that may help facilitate a better understanding of the disclosure. Accordingly, these statements are to be read in this light and are not to be understood as admissions about what is or is not prior art.

In recent years, the prices of image sensors (i.e., cameras) have dropped significantly making cameras as one the most ubiquitous sensing devices deployed throughout the world. Camera can capture a wide range of information. Cameras can be used to monitor traffic flow, view wildlife, detect intruders, detect anomalies, or determine weather conditions. Millions of network cameras are now connected to the Internet for a variety of purposes. Currently, nearly two hundred million network cameras have been deployed. Real-time visual data can be used in many applications, such as emergency responses, in a real-time manner. Some of these data streams are publicly available without password protection. As researchers gain the ability to collect large amounts of visual data about the world, the true potential of data-driven research is recognized. With the emergence of new machine-learning technologies, a wealth of previously untapped potential for large-scale visual data analysis has surfaced. In 2020, 75% of mobile device data traffic will be video and 82% of internet protocol (IP), i.e., non-mobile, traffic will be video. Visual data is substantial because one high definition (HD) video camera can produce data orders of magnitude faster than text data. Computer vision is becoming one of the central data-analysis techniques driving big-data research. Visual data (image and video) provides a high level of utility because of the versatility and the rich information it provides. A single image may reveal many different types of information. For example, routine traffic camera can provide information about suspects in a bank robbery, or a terrorist attack.

Despite the large amount of real-time data publicly available via publicly accessible cameras, two major challenges inhibit the true potential of analyzing the real-time data from these cameras. The first challenge is identifying these cameras either statically or dynamically on the fly (i.e., real-time). This challenge is particularly problematic since there is a wide range of protocols used to retrieve data from network cameras, since different brands of network cameras need different retrieval methods (for example, different paths for hypertext transfer protocol (HTTP) GET commands). While to date there are samplings of various databases including small number of cameras, there is not a global database, in particular one which can be dynamically populated on the fly.

A second challenge is a need for contextual information. Context could include the camera's location, refresh rate, whether it is indoor or outdoor, and so on. This contextual information is called metadata and can be helpful for data analytics. Metadata can be useful for identifying the cameras for specific purposes, for example, traffic cameras for studying urban transportation. However, to date prior art methods and system have not provided the capability to identify at a global scale camera metadata, once each camera has been identified.

Therefore, there is an unmet need for a novel system and method that can i) identify publicly available cameras at a global level either statically for populating a database, or dynamically on the fly; and ii) determine metadata associated with those cameras either statically for populating a database, or dynamically on the fly.

SUMMARY

A method for identifying network cameras is disclosed. The method includes receiving name of an organization, identifying a range of internet protocol (IP) addresses associated with the organization, querying each IP address in the range of the IP addresses, receiving a response from the IP addresses in response to the queries, verifying the received response is from a camera by obtaining an image file from the IP address and analyzing the image file, and adding IP address to a list of cameras.

A system for identifying network cameras is disclosed. The system includes a communication hub coupled to the network of at least one camera, at least one electronic communication device, a data processing system coupled to the communication hub, the data processing system comprising one or more processors. The one or more processors configured to receiving name of an organization, identifying a range of internet protocol (IP) address associated with the organization, for each IP address, querying IP addresses in the range of IP addresses, receiving a response from the IP addresses in response to the queries, verifying the received response is from a camera by obtaining an image file from the IP address and analyzing the image file, and adding IP address to a list of cameras.

BRIEF DESCRIPTION OF THE DRAWINGS

In the following description and drawings, identical reference numerals have been used, where possible, to designate identical features that are common to the drawings.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel system and method is provided in the present disclosure that can i) identify publicly available cameras at a global scale either statically for populating a database, or dynamically on the fly; and ii) determine metadata associated with those cameras either statically for populating a database, or dynamically on the fly.

Millions of network cameras have been deployed worldwide. Many of them have restricted accesses, protected by passwords or within private networks. However, a network of cameras connected to the Internet currently in the millions make data publicly available on the Internet. However, even though the data is public, there is no central repository through which visual data from many different sources can be retrieved. If the visual data could be easily obtained and analyzed, many time-sensitive problems could be solved more easily. For example, by monitoring and recording and re-recording small time-segments from each camera, visual analytic techniques can be used to detect anomalies and when such anomalies occur to pass on the last generation of recordings to the authorities with location and content in order to quickly begin investigation of such anomalies as well as providing quick responses therefor. In general, if network cameras have high refresh rates, the visual data can be used to observe the development of a fast-moving event (e.g., an explosion). If network cameras do not have a fast refresh rate, their visual data can still be used to observe the development of a slow-moving event (e.g., a flood).

The present disclosure classifies network cameras into two types: IP cameras and Non-IP cameras. IP cameras have individual (Internet Protocol) IP addresses and anyone on the Internet can communicate with the cameras directly (some cameras may have password protection). IP cameras usually have built-in web servers and can respond to hypertext transfer protocol (HTTP) GET requests. Non-IP cameras do not have individual IP addresses and are not directly accessible on the Internet. Automatic identification of these two types of cameras is one of the many aspects of the present disclosure.

Figure 1A:
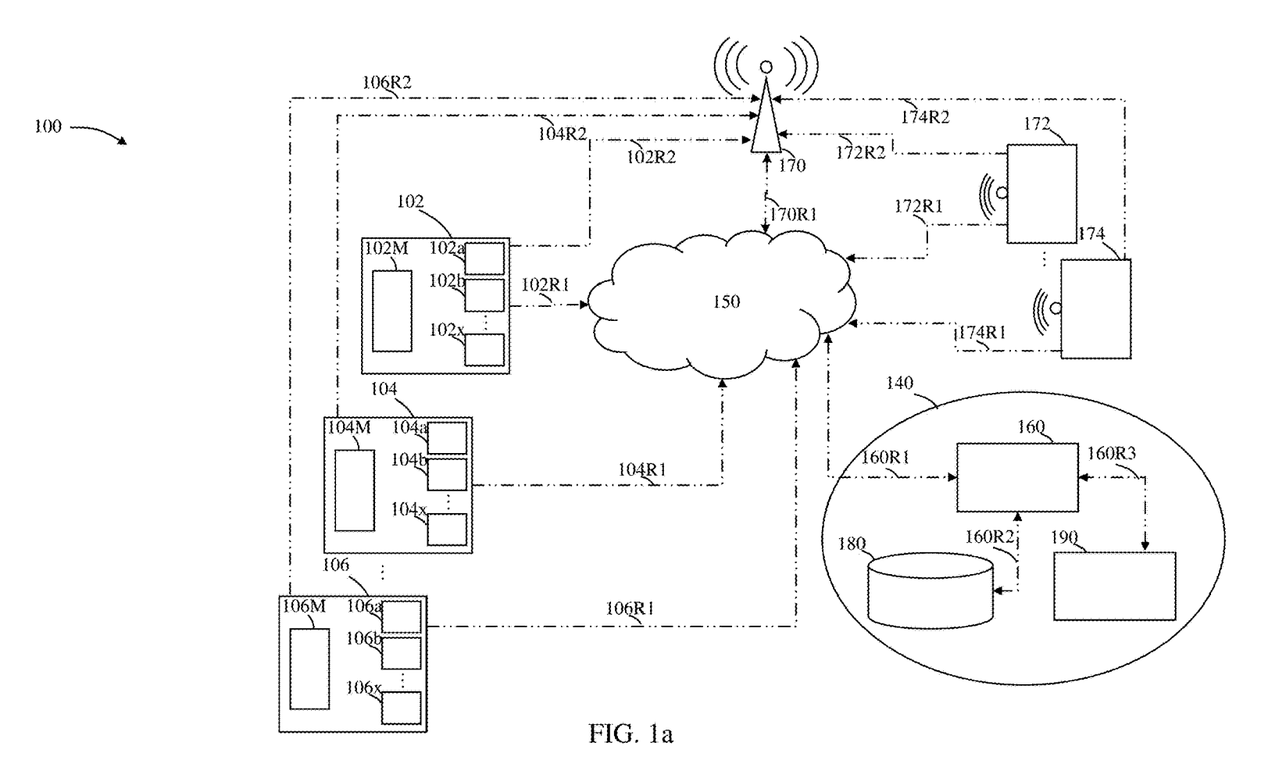
FIG. 1a is a schematic of system according the present disclosure for identifying cameras including a data processing system.

Before discussing the system and method of identifying cameras and the associated metadata (discussed below in reference to FIGS. 4 and 5), reference is made to FIG. 1a. Referring to FIG. 1a, a schematic of components of a system 100 according to one embodiment of the present disclosure is provided. The system 100 includes in general terms at least a network of at least one camera 102, 104, . . . 106. The system 100 is adaptable to include only one camera up to hundreds of thousands of cameras. Each camera (e.g., 102), may include one or more communication blocks (102a, 102b, . . . 102x for camera 102; 104a, 104b, . . . 104x for camera 104; and 106a, 106b, . . . 106x for camera 106). These communication blocks are configured based on various communication protocols (e.g., 802.11, cell phone protocols such as CDMA or GSM, or any other wireless protocol such as Bluetooth, or other). Each of these cameras can be connected to a local network device, e.g., a cell tower 170 or via a router (not shown) and then to a cloud-based information exchange 150. The connectivity between cameras (102, 104, . . . 106) and the cloud-based information exchange 150 is identified as 10_R1 (e.g., 102R1, 104R1, and 106R1). Alternatively, connectivity to the cell tower 170 is identified as 10_R2 (e.g., 102R2, 104R2, and 106R2). Each camera (102, 104, . . . 106) also includes an optic block 10_M (e.g., 102M, 104M, and 106M) which includes the associated optical and electronic components present in cameras (publicly available or CCTV), known to a person having ordinary skill in the art. The cloud-based information exchange 150 and the tower 170 individually or together represent a communication hub.

Also, shown in FIG. 1a is a data processing system 140, comprising one or more processing units 160, one or more databases (or otherwise referred to as storage devices) 180, and one or more user input/output devices 190. The one or more processing units 160 communicates with the one or more databases 180 via connectivity 160R2 (e.g., Ethernet, Bluetooth, etc.), and with the one or more input/output devices 190 via connectivity 160R3 (e.g., Ethernet, Bluetooth, etc.). The data processing system 140 communicates with the cloud-based information exchange 150 via connectivity 160R1.

Also, shown in FIG. 1a are user devices 172 . . . 174 (e.g., cell phones), also referred to as electronic communication devices, adapted to be connected to the cell tower 170 by cell phone protocols such as CDMA or GSM (via connectivity 17_R2, e.g., 172R2 . . . 174R2); or directly to the cloud-based information exchange 150 via, other wireless protocol such as Bluetooth, or other, using connectivity 17_R1, e.g., 172R1 and 174R1. Each such user device (e.g., 172 . . . 174) allows users to communicate with the data processing system 140 through the cloud-based information exchange 150. Additional information regarding FIG. 1a is provided at the end of the present disclosure.

Figure 1B:
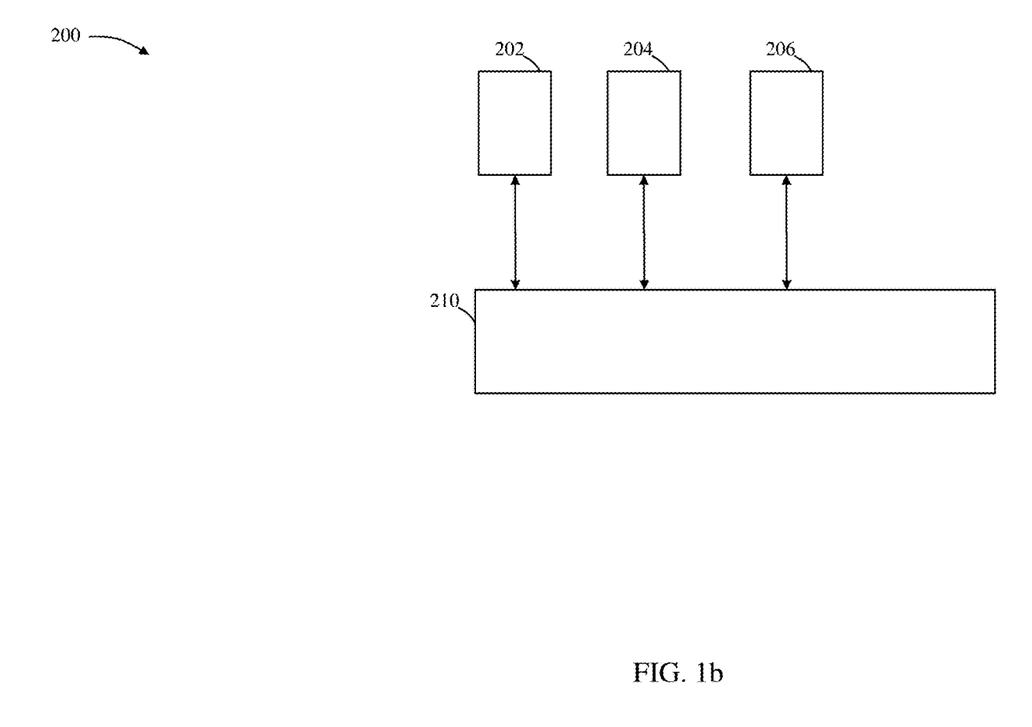
FIG. 1b is a is a block diagram of operations that take place in the data processing system of FIG. 1, including a data processing block.

The data processing system 140 shown in FIG. 1a includes an operational system 200 depicted in FIG. 1b. The operational system 200 includes several blocks including a camera identification block 202, a camera metadata block 204, a third-party mapping interface 206, a camera-associated information data block 208, and a data processing block 210. According to one embodiment of the present disclosure, the camera identification block 202 identifies cameras in a particular geographical zone of interest. Such a zone may be based on postal zip-codes, a township, a university campus, a shopping mall, etc. The camera identification block 202 is based on i) a predetermined list of cameras provided for a predetermined zone; ii) an automatic identification scheme to identify cameras that are accessible using IP addresses; or iii) an automatic identification scheme to identify closed circuit television cameras that are not accessible based on IP addresses but are accessible via a website. For example, for a university campus, the camera identification block 202 includes a list of cameras deployed throughout the campus that are viewable by authorities (e.g., campus police). This list provides camera identifiers. The camera identification can be achieved by uploading the list, or automatically searching for cameras as will be discussed in FIGS. 4 and 5.

According to one embodiment of the present disclosure, the camera metadata block 204 provides camera metadata in the geographical zone of interest (e.g., a university campus). The metadata includes location of the camera, viewing angle, and other data associated with camera type. The camera metadata block 204 is based on i) a predetermined list of camera metadata provided for the cameras identified by the camera identification block 202; ii) an automatic determination scheme to determine camera metadata that are accessible using IP addresses; or iii) an automatic identification scheme to identify closed circuit television cameras that are not accessible based on IP addresses but are accessible via a website. For each camera identified in the camera identification block 202, metadata associated with that camera is provided in the camera metadata block 204. For example, for each camera from the list of cameras (e.g., cameras 102, 104, . . . 106 shown in FIG. 1a), the camera metadata block 204 provides location data, viewing angle, whether equipped with infrared capabilities, range of camera for both daytime as well as night time and based on if equipped with infrared capabilities, internet protocol (IP) address provided in a transmission control protocol and IP (TCP/IP) network, make-model and serial number of the camera, communication protocol, frame rate, etc. Therefore, once the cameras identification has been provided by the camera identification block 202, the camera metadata block 204 communicates the above-mentioned information about the cameras to the data processing block 210.

According to one embodiment of the present disclosure, the third-party mapping interface 206 provides an interface to a $3^{rd}$ party mapping system (e.g., BING MAP). The third-party mapping interface 206 provides input data to the $3^{rd}$ party mapping system and receives output mapping data from the $3^{rd}$ party mapping system including street views. These street views can be used to i) verify metadata including location information, viewing angle and other metadata determined in block 204 of the cameras identified in block 202. In addition, the third-party mapping interface 206 provides an input/output interface that enables a user to provide inputs (such as a start point and end point) and provide output to the user (such as a travel path). The interface is provided to the user devices 172 . . . 174, through the cloud-based information exchange 150 or the cell tower 170 (see FIG. 1a). Once the user inputs data including a start point and an end point through the third-party mapping interface 206, the $3^{rd}$ party mapping system is adapted to provide a map that can be augmented by the data processing block 210.

According to one embodiment of the present disclosure, the data processing block 210 receives camera identification information from the camera identification block 202, camera metadata from the camera metadata block 204, and the $3^{rd}$ party mapping information from the third-party mapping interface 206. The data processing block 210 utilizes these data to generate a list of cameras and their associated metadata to be used by the data processing block 210 for various applications. One such application is determination of a safe travel path which is described in the U.S. Non-provisional patent application Ser. No. 15/468,014, concurrently filed with the present application. Yet other applications include anomaly determination. For example, the camera described herein that are deployed in an urban area can be used to provide a monitoring network. Output of each camera can be recorded a short period time, e.g., about 2 minutes, prior to the recording be re-recorded with the next recording period (i.e., the next 2 minutes). If an anomaly is detected, e.g., a large flash of light, the recording associated with that anomaly (about 1 minute prior and about 1 minute after to the detection of an anomaly) can be transferred to a permanent recording, while alerting the authorities of an ongoing event.

Figure 2:
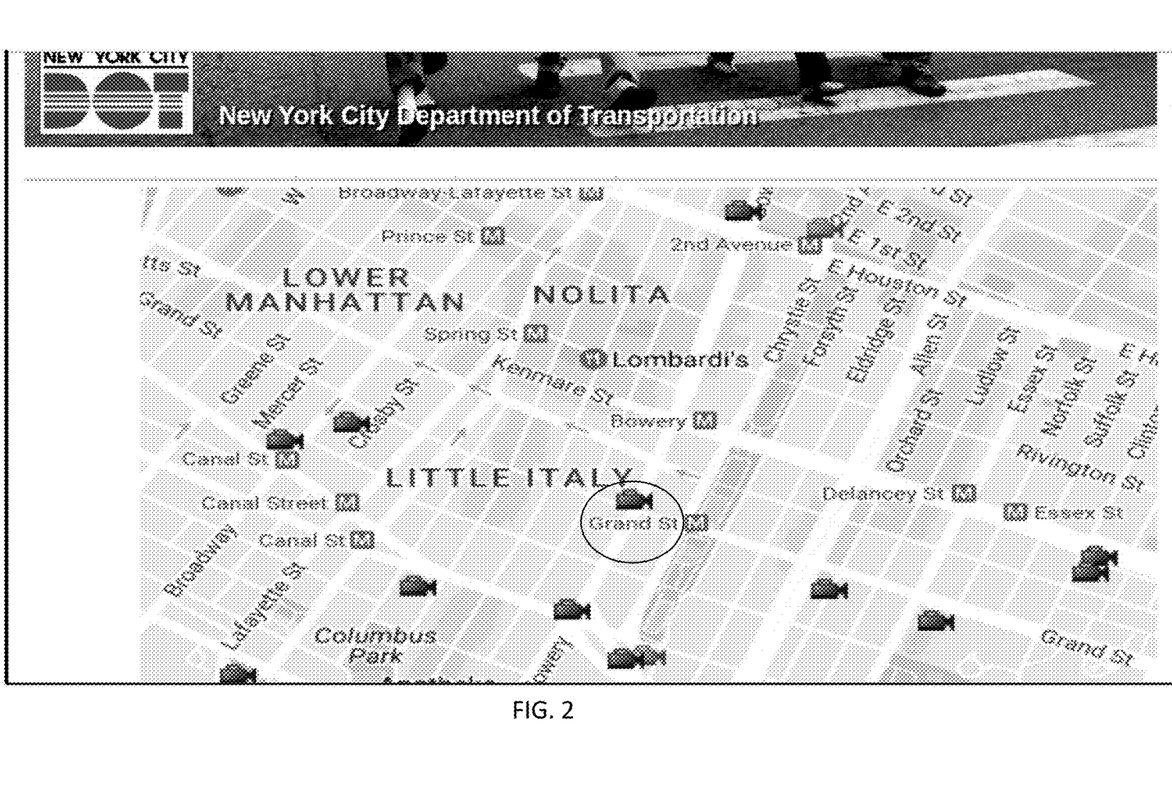
FIG. 2 is an exemplary schematic of a map depicting location of cameras, including a camera at a circled cross-section.
Figure 3:
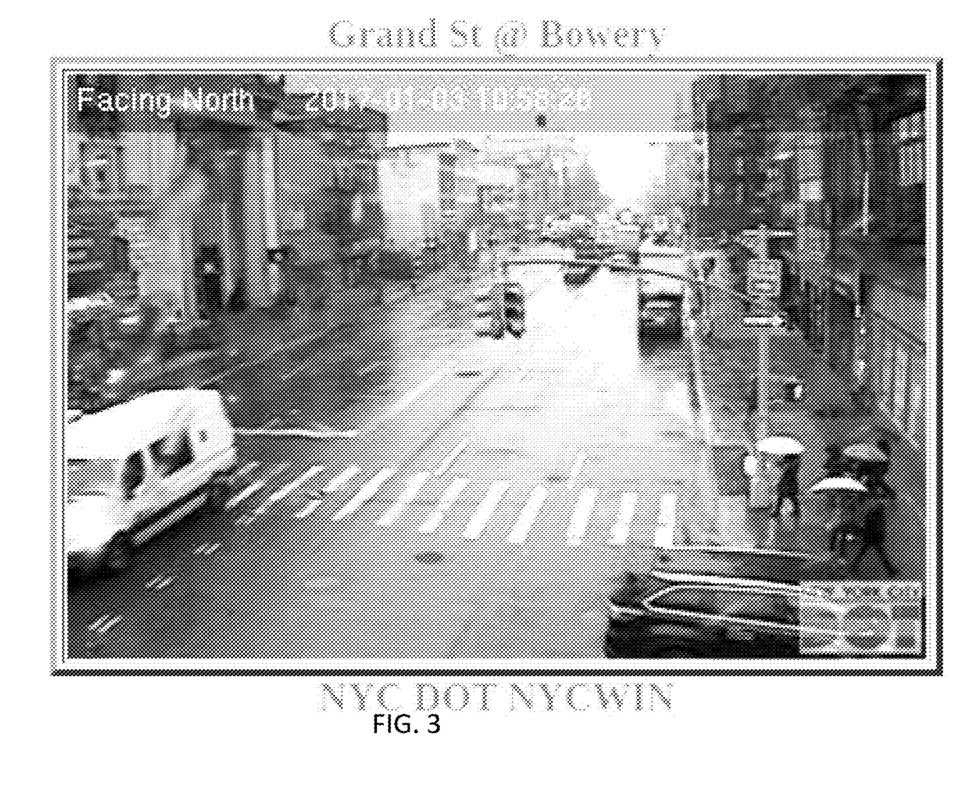
FIG. 3 is a visual output of the camera circled in FIG. 2.

As discussed above, FIGS. 4 and 5 provide flow charts that can be used by the camera identification block 202, the camera metadata block 204, and the data processing block 210 in order to statically or dynamically identify publicly accessible cameras (including IP-based cameras as well as non-IP-based cameras). IP-based cameras can be accessed individually and from which visual data can be retrieved. Usually, the data streams from Non-IP cameras are aggregated into file servers and are accessible through websites. Many websites aggregate visual data from multiple cameras. For example, FIG. 2 shows a website that displays the locations of traffic cameras in New York City, with one of those cameras identified in a circle (at the corner of Grand Street and Bowery St.). FIG. 3 depicts a snapshot from the traffic camera circled in FIG. 2. The data processing block 210 can monitor whether anomalies (an accident) have occurred on these streets and alert authorities. As mentioned in the background section of the present disclosure, a potential of the real-time data analysis from network cameras can only be exploited if the data is aggregated and made available statically into a repository or dynamically on the fly as requested by a user. However, there is a wide variation of aggregation of data. FIG. 5 provides a novel and unique approach to automatically and either statically or dynamically navigate through these variations.

Figure 4:
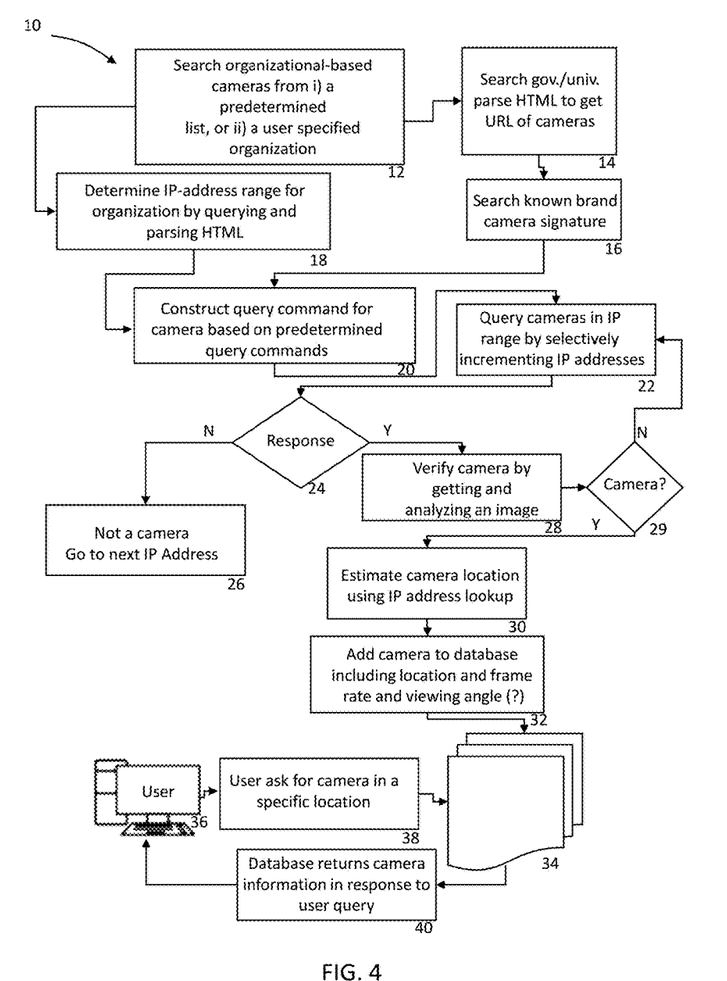
FIG. 4 is a flowchart according to the present disclosure for identifying internet protocol (IP)-based cameras and steps associated with determining metadata associated with the identified cameras.
Figure 5:
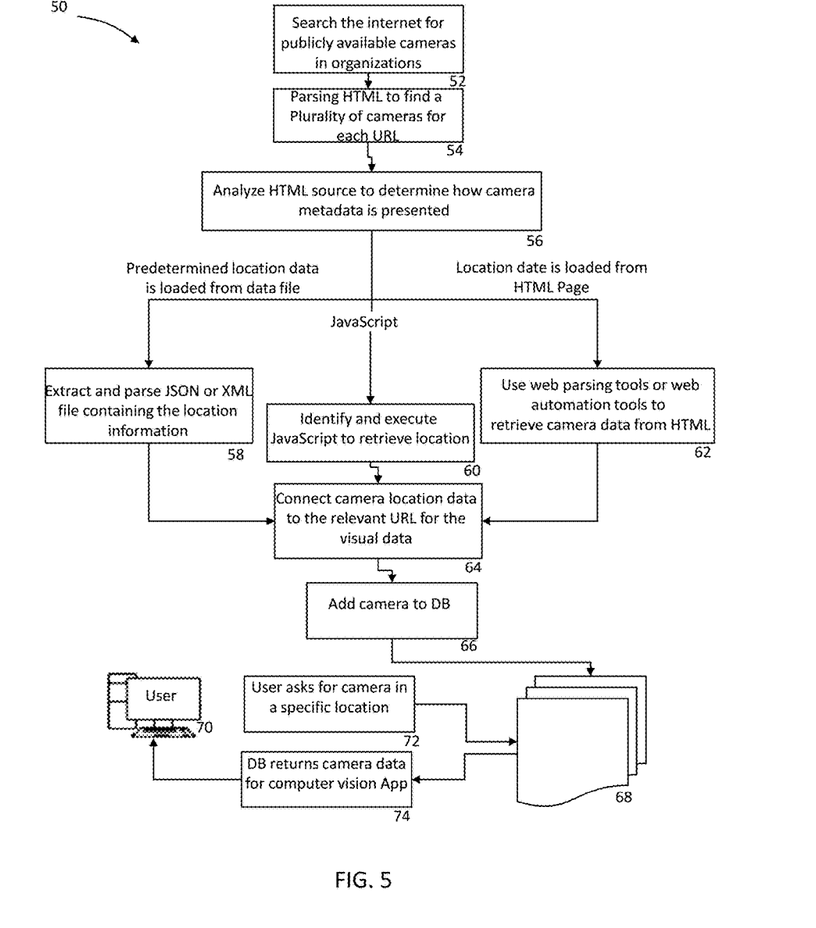
FIG. 5 is a flowchart according to the present disclosure for identifying non-IP-based cameras and steps associated with determining metadata associated with the identified cameras.

Referring to FIG. 4, a flowchart 10 of the IP-based camera identification and metadata determination method is provided. The flowchart 10 begins with searching organizational-based cameras in block 12. This search is in response to i) a predetermined list of organization; or ii) a user requesting identification of cameras associated with an organization. The organization can be a city, a township, a university campus, a private institution, or a plurality of other organization, each with cameras that are either secure or publicly available. The data processing block 210 in response to an organization selection queries (e.g., using GOOGLE) that organization for cameras. For example, a simple query can be "New York Traffic Cameras." The data processing block 210 parses the returned HTML for URL of cameras. However, typically in such HTML outputs there may be a substantial amount of non-useful information. In order to further filter the information, the data processing block 210 is adapted to search for known camera signatures in the returned HTML as provided in block 16. The output of block 16 includes a list of IP addresses for potential cameras (however, at this point whether an IP address is a camera or not is not yet fully determined). Next, in addition or alternatively, in block 18, the data processing block 210 queries the organizational list of block 12 to query for a list of IP ranges for the associated organizations. The IP address range is determined by parsing a returned HTML. With a range of IP addresses (either via block 18 or block 16, or both), in block 20 various queries are constructed to determine whether each IP address obtained (either from block 18 or block 16) belongs to a camera. The query commands (e.g. using HTTP GET command) can be from a list of predetermined query commands run for i) each IP address; or ii) based on selective criteria specified by a user, as provided in block 22. Next in block 24, the data processing block 210 queries to determine whether the camera responds. If the answer to that query is no (identified as "N" because the camera did not respond, as in block 26), the data processing block 210 determines that to be a non-camera, and proceeds to the next IP address. If, the answer to that query is yes (identified as "Y" because a response to the query command was obtained, as in block 28), the data processing block 210 confirms the responding IP address is indeed a camera by requesting an image and inspecting the data associated with the image, as in block 29. If, the answer to that query is yes (identified as "Y" because inspection of data confirms data is from a camera), the data processing block 210 proceeds to block 30. If, the answer to that query is no (identified as "N" because inspection of data confirms data is not from a camera), the data processing block 210 returns back to the block 22 to increment to the next IP address.

In block 30, the data processing block 210 estimates camera location by running a query to determine physical location based on IP address, as known to a person having ordinary skill in the art. Alternatively or in addition (not shown), the data processing block 210 can access street views from the $3^{rd}$-party mapping system by accessing the third-party mapping interface 206 and determine or confirm the location of camera identified in blocks 28 and 29. An example of such a technique is provided in "Accurate Localization In Dense Urban Area Using Google Street View Images" by Salarian et al. (2014) found at https://arxiv.org/ftp/arxiv/papers/1412/1412.8496.pdf, incorporated by reference into the present disclosure in its entirety.

With the location information determined and confirmed, the block 32 adds the IP-based camera to a database 34 for a later use in a static approach or immediate use on the fly in a dynamic approach, as per block 32. The data processing block 210 then again goes back to block 22 (not shown) to increment the next IP address, until all IP addresses have been exhausted. The user (identified as block 36) using a computer connection or a mobile device connection can then request cameras in a specific location or organization as per block 38, and the data processing block 210 search the database 34 and returns camera information (and optionally images) as per block 40.

Referring to FIG. 5, a flow chart 50 of the non-IP-based camera identification and metadata determination method is provided. The flowchart 50 begins in a similar manner as flowchart 10 in FIG. 4 by searching for non-IP cameras (e.g., entering "Atlanta Traffic Cameras") in an organization in block 52. In block 54, the data processing block 210, parses the retuned HTML to find a plurality of cameras. In block 56, the HTML is analyzed to determine how the cameras' metadata is presented. Three known approaches are contemplated by the present disclosure. In one approach, predetermined location data is loaded from a data file by extracting and parsing JSON or XML files containing location information, as per block 58. In another embodiment, a JavaScript is detected and the data processing block 210 executes the JavaScript in block 60 to determine location data. In yet another embodiment, the location is simply loaded from the returned HTML by using a web parsing tool, as known to a person having ordinary skill in the art, per block 62.

Once all the camera locations have been identified from any combination of the above embodiments, the data processing block 210 in block 60 couples camera location to each URL identified in block 54. In block 66, the data processing block 210 adds the camera to a database 68 for use by the user per blocks 72 and 74, as discussed in FIG. 4.

With respect to FIGS. 4 and 5, Parsing scripts take advantage of several PYTHON modules and APIs. Two of the most commonly used tools are the HTML parsing module SELENIUM and BEAUTIFULSOUP4, known to a person having ordinary skill in the art. SELENIUM is a browser automation tool that supports FIREFOX and CHROME. For parsing camera data, SELENIUM has several advantages. SELENIUM executes all the JavaScript on a page load, which is one major advantage when compared to BEAUTIFULSOUP4. SELENIUM allows access to webpage elements by Xpath. Xpath is a way of navigating the hierarchy of the HTML syntax. BEAUTIFULSOUP4 (BS4) is another tool used for parsing websites for camera data. BS4 uses a different approach: Instead of fully rendering the page in a browser, BS4 downloads the page source and parses the HTML into a Python object. BS4 does not fully render the page, so it is faster than Selenium. Selenium can access information only in the current fully rendered page; BS4 can store multiple HTML pages, each in its own PYTHON object. BS4 does not simulate user interactions, such as clicks or keyboard presses; thus, BS4 is faster than SELENIUM.

Website-parsing scripts that take advantage of both SELENIUM and BS4 are often the best option. Selenium can be used to load the webpage in a headless browser, such as PhantomJS. PhantomJS does not need to fully render the page. After the page is rendered, the HTML source can be sent to BS4 scripts to extract information. This method is faster and more reliable.

Information about camera location may be obtained by analyzing the JSON or XML file. It is possible using the CHROME DEVELOPER TOOLS to view XML HTTP Requests (XHR), as provided below.

{markers: [{id: "368", latitude: "40.79142677512476", longitude: "−73.93807411193848",...},...]}
▶ markers: [{id: "368", latitude: "40.79142677512476", longitude: "−73.93807411193848",...},...]

Some websites load many different XHR files; some sites load data from several JSON files into one map. If the JSON file containing the location data can be found, Python JSON module is used to parse the JSON data and retrieve the location information. In the snippet of JSON code below, the latitude, longitude, and camera ID can be identified.

While not shown, other aspects of metadata discussed above (including frame rate) can also be determined for both IP and non-IP based cameras. In one embodiment, view angle for each identified camera can be determined by a method provided in "Estimating Camera Pose from a Single Urban Ground-View Omnidirectional Image and a 2D Building Outline Map" (2010) by Cham et al. found at http://ieeexplore.ieee.org/abstract/document/5540191/, incorporated by reference in its entirety into the present disclosure.

To determine a camera's frame rate, the data processing block 210 detects the changes between two adjacent frames. This may take from several seconds (for a camera with a high refresh rate) to a few hours (for a camera with a low refresh rate).

The data processing block 210 obtains the information about a list of cameras from the database and retrieves snapshots from these cameras.

Further referring to FIG. 1a, the one or more processing units 160, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

The one or more processing units 160 can implement processes of various aspects described herein. The one or more processing units 160 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. The one or more processing units 160 can include Harvard-architecture components, modified-Harvard-architecture components, or Von-Neumann-architecture components.

The phrase "communicatively connected" or connectivity includes any type of connection, wired or wireless, for communicating data between devices or processors. These devices or processors can be located in physical proximity or not. For example, the one or more processing units 160, the one or more databases 180, and the one or more input/output devices 190 are shown separately from the one or more processing units 160 but can be stored completely or partially within the one or more processing units 160.

The one or more input/output devices 190 can include a mouse, a keyboard, another computer (connected, e.g., via a network or a null-modem cable), or any device or combination of devices from which data is input to the one or more processing units 160. The one or more input/output devices 190 also can include a display device, a processor-accessible memory, or any device or combination of devices to which data is output by the one or more processing units 160. The one or more input/output devices 190 and the one or more databases 180 can share a processor-accessible memory.

The connectivity 160R_ (e.g., 160R1, 160R2, and 160R3) can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. The connectivity 160R_ (e.g., 160R1, 160R2, and 160R3) sends and receives electrical, electromagnetic or optical signals that carry digital or analog data streams representing various types of information across network link via a switch, gateway, hub, router, or other networking device.

The one or more processing units 160 can send messages and receive data, including program code, through the connectivity 160R_ (e.g., 160R1, 160R2, and 160R3). For example, a server can store requested code for an application program (e.g., a JAVA applet) on a tangible non-volatile computer-readable storage medium to which it is connected. The server can retrieve the code from the medium and transmit it through connectivity 160R_ (e.g., 160R1, 160R2, and 160R3). The received code can be executed by the one or more processing units 160 as it is received, or stored in the one or more databases 180 for later execution.

The one or more databases 180 can include or be communicatively connected with one or more processor-accessible memories configured to store information. The memories can be, e.g., within a chassis or as parts of a distributed system. The phrase "processor-accessible memory" is intended to include any data storage device to or from which the one or more processing units 160 can transfer data, whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the one or more databases 180 can be a tangible non-transitory computer-readable storage medium, i.e., a non-transitory device or article of manufacture that participates in storing instructions that can be provided to processor 186 for execution.

In an example, the one or more databases 180 includes code memory, e.g., a RAM, and disk, e.g., a tangible computer-readable rotational storage device such as a hard drive. Computer program instructions are read into code memory from disk. The one or more processing units 160 then executes one or more sequences of the computer program instructions loaded into code memory, as a result performing process steps described herein. In this way, the one or more processing units 160 carries out a computer implemented process. For example, steps of methods described herein, blocks of the flowchart illustrations or block diagrams herein, and combinations of those, can be implemented by computer program instructions. Code memory can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer instructions that can be loaded into the one or more processing units 160 (and possibly also other processors), to cause functions, acts, or operational steps of various aspects herein to be performed by the one or more processing units 160 (or other processors). Computer program code for carrying out operations for various aspects described herein may be written in any combination of one or more programming language(s), and can be loaded from disk into code memory for execution.

The program code may execute, e.g., entirely on the one or more processing units 160, partly on the one or more processing units 160 and partly on a remote computer connected to data processing system 140, or entirely on the remote computer.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method for identifying network cameras, comprising:
    (a) receiving name of an organization by one or more processors;
    (b) performing an internet search via a script for the name associated with the organization by the one or more processors, thereby generating a plurality of website Hypertext Markup Language (HTML) listings, and parsing each of the generated HTMLs to identify a range of internet protocol (IP) addresses for the associated organization by the one or more processors;
    (c) querying each IP address in the range of the IP addresses by the one or more processors;
    (d) receiving a response from each queried IP address by the one or more processors;
    (e) verifying the received response is from a camera by obtaining an image file from the IP address and analyzing the image file by the one or more processors; and
    (f) adding the IP address to a list of identified cameras upon verification by the one or more processors.

2. The method of claim 1, the name of the organization is received from an electronic communication device.

3. The method of claim 2, the electronic communication device is a cellular phone.

4. The method of claim 1, the name of the organization is received from a predetermined list.

5. The method of claim 1, further comprising:
    (g) identifying metadata associated with each identified camera by the one or more processors.

6. The method of claim 5, the metadata includes location data.

7. The method of claim 6, wherein each of the IP addresses is associated to the location data by the one or more processors by using an IP address to physical address translator.

8. The method of claim 6, further comprising:
    (h) verifying the location information by using a street-view of a $3^{rd}$-party mapping software by the one or more processors.

9. The method of claim 1, steps (a)-(f) are preformed dynamically in response to a request by a user.

10. A system for identifying cameras, comprising:
    a network of at least one camera;
    a communication hub coupled to the network of at least one camera;
    at least one electronic communication device;
    a data processing system coupled to the communication hub, the data processing system comprising one or more processors configured to:
    (a) receive name of an organization,
    (b) perform an internet search via a script for the name associated with the organization, thereby generate a plurality of website Hypertext Markup Language (HTML) listings, and parsing each of the generated HTMLs to identify a range of internet protocol (IP) addresses for the associated organization,
    (c) query each IP address in the range of IP addresses,
    (d) receive a response from the IP addresses in response to the queries,
    (e) verify the received response is from a camera by obtaining an image file from the IP address and analyzing the image file, and
    (f) adding the IP address to a list of cameras upon the verify step.

11. The system of claim 10 the electronic communication device is a cellular telephone.

12. The system of claim 11, the electronic communication device communicates with the data processing system via one or more CDMA, GSM Bluetooth, and 802.11 protocols.

13. The system of claim 12, the network of at least one camera communicates with the data processing system via one or more CDMA, GSM Bluetooth, and 802.11 protocols.

14. The system of claim 10, the data processing system further comprising:
    one or more storage devices; and
    one or more user input/output devices.

15. The system of claim 10, the name of the organization is received from the electronic communication device.

16. The system of claim 10, the name of the organization is received from a predetermined list.

17. The system of claim 10, the one or more processors further configured to:
    (g) identify metadata associated with each identified camera.

18. The system of claim 17, the metadata includes location data.

19. The system of claim 18, wherein each of the IP addresses is associated to the location data by using an IP address to physical address translator.

20. The system of claim 18, the one or more processors further configured to:
    (h) verify the location information by using a street-view of a $3^{rd}$-party mapping software.

\* \* \* \* \*